(12) United States Patent
Anderson et al.

(10) Patent No.: US 11,379,166 B2
(45) Date of Patent: Jul. 5, 2022

(54) PRINT JOB LISTING

(71) Applicant: HEWLETT-PACKARD DEVELOPMENT COMPANY, L.P., Spring, TX (US)

(72) Inventors: James E. Anderson, Boise, ID (US); Peter G Hwang, Columbia, WA (US); Randy B Davenport, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,400

(22) PCT Filed: Jun. 29, 2018

(86) PCT No.: PCT/US2018/040376
§ 371 (c)(1),
(2) Date: Oct. 2, 2019

(87) PCT Pub. No.: WO2020/005284
PCT Pub. Date: Jan. 2, 2020

(65) Prior Publication Data
US 2021/0326085 A1    Oct. 21, 2021

(51) Int. Cl.
*G06F 3/12*    (2006.01)

(52) U.S. Cl.
CPC .......... *G06F 3/1222* (2013.01); *G06F 3/1238* (2013.01); *G06F 3/1267* (2013.01)

(58) Field of Classification Search
None
See application file for complete search history.

(56) References Cited

U.S. PATENT DOCUMENTS

| | | | |
|---|---|---|---|
| 7,474,862 B2 | 1/2009 | Shouno | |
| 7,620,177 B2 | 11/2009 | Ibrahim et al. | |
| 8,797,563 B2 | 8/2014 | Nuggehalli et al. | |
| 11,093,189 B2 * | 8/2021 | Tomihisa | G06F 3/1254 |
| 2005/0243363 A1 | 11/2005 | Muto | |
| 2007/0103714 A1 * | 5/2007 | Ushiku | H04N 1/00474 358/1.14 |
| 2013/0286420 A1 | 10/2013 | Tonegawa | |
| 2014/0211240 A1 | 7/2014 | Maki | |
| 2014/0368850 A1 | 12/2014 | Kodama | |
| 2015/0212704 A1 * | 7/2015 | Holt | G06F 3/04883 715/817 |
| 2017/0160996 A1 * | 6/2017 | Ohba | G06F 3/1222 |
| 2017/0199710 A1 | 7/2017 | Ando | |

FOREIGN PATENT DOCUMENTS

JP    2001205863 A    7/2001

* cited by examiner

*Primary Examiner* — Thomas D Lee
(74) *Attorney, Agent, or Firm* — Mannava & Kang, P.C.

(57) ABSTRACT

Examples disclosed herein relate to displaying, in a user interface, a list of available print jobs, wherein at least one of the available print jobs comprising a secured print job is displayed as a placeholder entry instead of an identifying entry, receiving a selection of the placeholder entry requesting an authentication for the secured print job, and displaying the identifying entry of the secured print job upon verification of the authentication.

20 Claims, 4 Drawing Sheets

PRINT JOB LISTING

BACKGROUND

Multi-function devices often combine different components such as a printer, scanner, and copier into a single device. Such devices frequently store jobs from different users that may be selected at a control panel associated with the device.

Figure 1A:
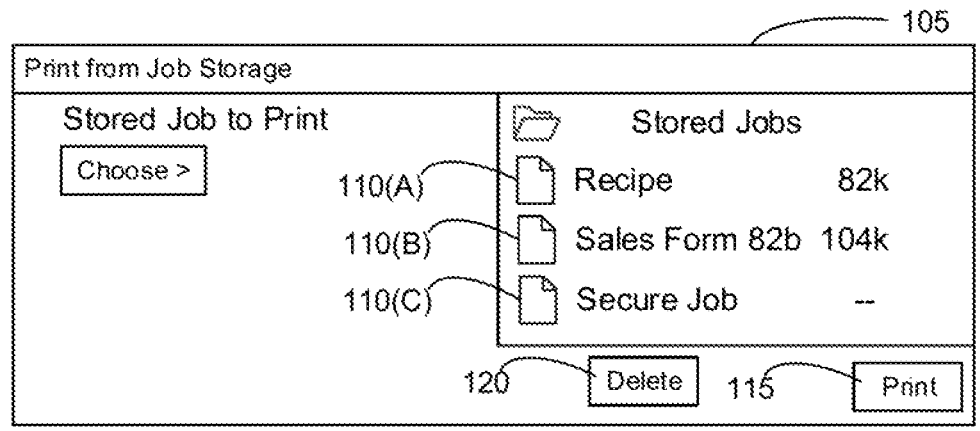
FIGS. 1A-1C are block diagrams of an example user interface for providing a print job listing.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

In many environments, a multi-function print device may be shared among several different users. These users may, for example, send documents to the device for printing. In some instances, the user may not want their print job to actually be printed out until they are at the device to retrieve, such as where the document contains confidential and/or personal information. In these instances, an option to protect the device is to require some form of authentication at the device to release the print job for processing by the device. For example, a user may log in using a username and password, authenticate via biometrics, a token, and/or RFID card, and/or enter a passcode such as a password and/or personal identification number (PIN). Once the authentication code is received, the device may process and print the waiting print job for the user.

In some cases, however, even showing that the job is waiting may reveal too much information. Displaying, for example, a file name associated with a job may reveal private information (e.g., a file named "John Smith disciplinary action for HR"). In such cases, the device may simply display a placeholder entry showing that there is at least one secure job waiting. The user may authenticate to the printer, and the printer may then display the details about jobs associated with that authentication and/or associated user.

FIG. 1A is a block diagram of an example user interface 105 comprising a list of available print jobs 110(A)-(C), a function key 115 and a job delete key 120. User interface 105 may be displayed, for example, on a capacitive touch screen control panel associated with a print device. In some implementations, the print jobs 110(A)-(C) may be displayed on a non-touch screen display, and may be interacted with via a keyboard or pointing device. In some implementations, user interface 105 may be displayed on a device separate from the print device, such as a mobile app on a smartphone connected to the print device (e.g., via Bluetooth and/or WiFi). To perform an operation on one of print jobs 110(A)-(C), a user may select one of the jobs and then select function key 115 associated with the operation (e.g., "Print"). In some implementations, a placeholder entry, such as the name "Secure Job" may be substituted for the file name, user, size and/or other information about a waiting job that requires authentication before printing. In some implementations, a single placeholder entry may be used to denote a plurality of waiting secure jobs, such that a user may select the single placeholder entry 110(C) without needing to decide among several similar entries. Other potential operations, such as sending via email, storing to remote network storage, and/or setting print options, are also contemplated.

Figure 1B:
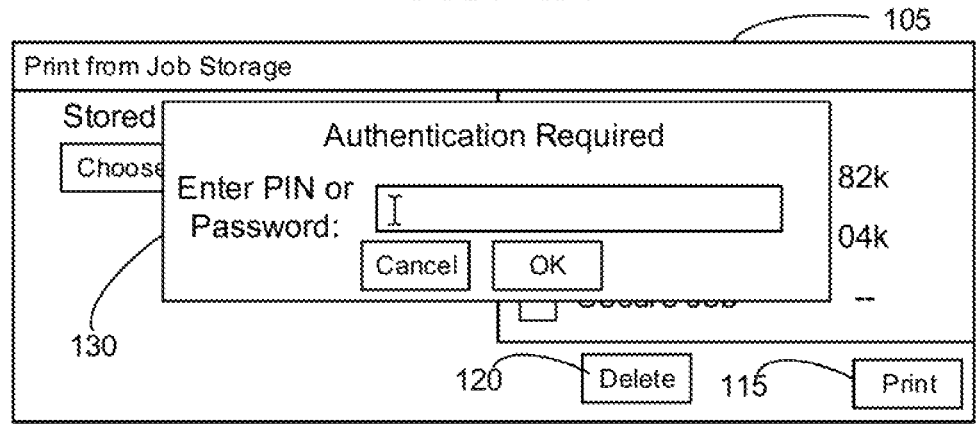

FIG. 1B is a block diagram of example user interface 105 displaying an authentication element 130. Element 130 may be displayed, for example, in response to receiving a selection of print job 110(C) ("Secure Job") and may allow the user to enter the appropriate authentication mechanism (e.g., username/password, PIN, alphanumeric code, etc.).

Figure 1C:
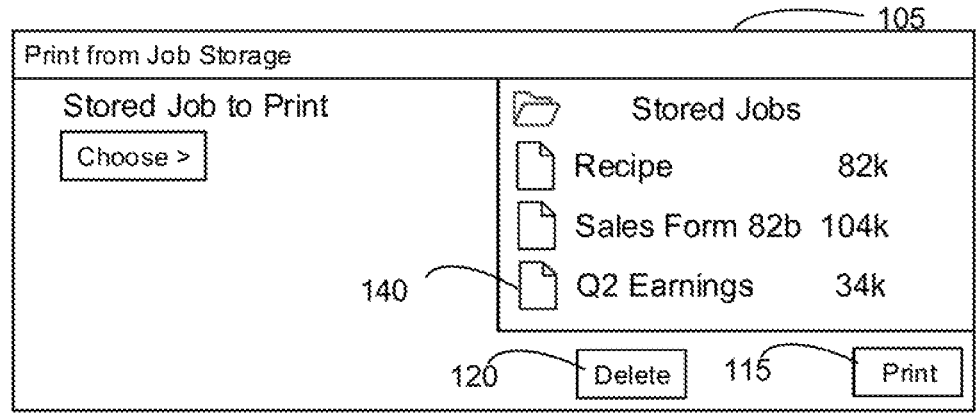

FIG. 1C is a block diagram of example user interface 105 updated after receiving a user authentication associated with placeholder print job 110(C). Placeholder print job 110(C) may be replaced on interface 105 with a new entry 140 showing details of the secure print job associated with the authentication. In some implementations, if multiple print jobs had been obfuscated by placeholder print job 110(C), all of the print jobs associated with the received authentication may be displayed in full detail. Once authentication has been received, function key 115 may be enabled for the secure print job. For example, prior to receiving the authentication, attempts to print the secure job by selecting that job and function key 115 may be ignored. In some implementations, functions associated with delete key 120 may be permitted on secure jobs without authentication. For example, a user may be able to delete stored secure jobs without having entered an associated authentication. This may be done, for example, because an authentication PIN has been forgotten and/or to clear up memory for new incoming jobs. In some implementations, a user may need to authenticate to the device as an administrator to delete stored jobs, but may still be unable to view details about those jobs. In some implementations, selection of the placeholder print job 110(C) may not be necessary. For example, a user may authenticate to the printer before selection of any job, and the device may update interface 105 to display all secured print jobs associated with the received authentication.

Figure 2:
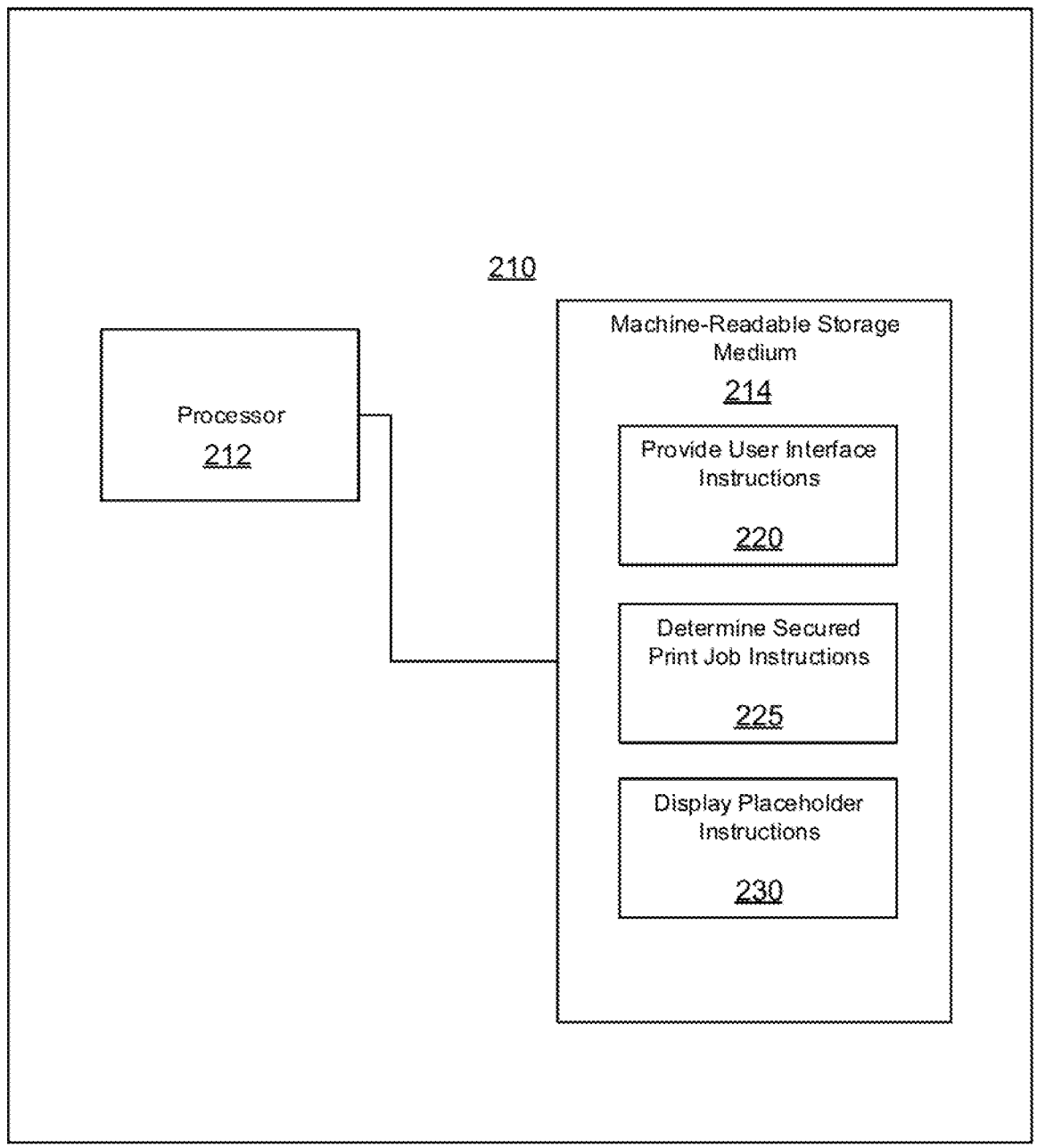
FIG. 2 is a block diagram of an example computing device for providing print job listing.

FIG. 2 is a block diagram of an example computing device 210 for providing print job listing. Computing device 210 may comprise a processor 212 and a non-transitory, machine-readable storage medium 214. Storage medium 214 may comprise a plurality of processor-executable instructions, such as provide user interface instructions 220, determine secured print job instructions 225, and display placeholder instructions 230. In some implementations, instructions 220, 225, 230 may be associated with a single computing device 210 and/or may be communicatively coupled among different computing devices such as via a direct connection, bus, or network.

Processor 212 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 214. In particular, processor 212 may fetch, decode, and execute instructions 220, 225, 230.

Executable instructions 220, 225, 230 may comprise logic stored in any portion and/or component of machine-readable storage medium 214 and executable by processor 212. The machine-readable storage medium 214 may comprise both volatile and/or nonvolatile memory and data storage components. Volatile components are those that do not retain data values upon loss of power. Nonvolatile components are those that retain data upon a loss of power.

The machine-readable storage medium 214 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Provide user interface instructions 220 may provide a user interface element for listing available print jobs. In some implementations, instructions 220 may comprise instructions to provide the placeholder list entry as a selectable user interface element. In some implementations, instructions 220 may comprise instructions to provide an authentication element in response to receiving a selection of the selectable user interface element.

Determine secured print job instructions 225 may determine whether at least one available print job comprises a secured print job. For example, if none of the listed print jobs are secured, there is no need to ask for authentication to print them. If the print job attempting to be selected by a user is secured, however, interface 105 may display the authentication element 130 before allowing that print job to be selected for an operation.

Display placeholder instructions 230 may, in response to determining that the at least one available print job comprises the secured print job, display a placeholder list entry instead of an identifying detail about the at least one available print job. In some implementations, the identifying detail about the print job may comprise a name of the print job, a user associated with the print job, and/or a size (e.g., number of pages and/or amount of memory consumed) of the print job. Other identifying details may comprise, for example, details about the print job such as page layout, media size, content description, finishing options, and/or colors used.

For example, device 210 may display user interface 105 listing print jobs 110(A)-110(C) submitted by one and/or more users. For jobs that are secured, such as by a PIN, password, and/or other required authentication, user interface 105 may display a placeholder list entry such as print job 110(C) that says "Secure Job" instead of providing any details such as the file name, size, submitting user, etc. The actual text of the placeholder list entry may be different, and/or may be configurable. In some implementations, for example, the entry may specify the user but not the details about the print job, such as "JSmith's Secure Job". In other implementations, print jobs may be displayed in folders, such as may be sorted by user such that each user's print jobs are in their own folder. In these implementations, secure print jobs may be displayed under a user's folder and/or in a separate "Secure Jobs" folder that serves to indicate that the secure jobs are available for unlocking and processing. In some implementations, the placeholder entry may indicate how many secure jobs are waiting, such as with a number in parentheses (e.g., "Secure Jobs (5)").

The list of print jobs 110(A)-110(C) may comprise selectable user elements. For example, a user may touch and/or use an interface device (e.g., mouse) to select each desired job and then select an operation, such as print function key 115 to perform that function. For secure jobs, the placeholder entry may not be selectable; attempts to select the placeholder entry may instead cause device 210 to display an authentication request such as authentication element 130 in user interface 105. Similar elements may be used to provide alternate instructions (e.g. "scan your ID badge", "Approve access to secure job through mobile app", "Enter username and password", etc.) Any number of authentication methods may be accepted and then verified for validity before replacing the placeholder entry and/or allowing a function, such as print, to be performed on one and/or more secured job.

In some implementations, instructions 220 may comprise instructions to display the identifying detail about the at least one available print job upon receiving a valid authentication via the authentication element. For example, after receiving a verified PIN in authentication element 130, user interface 105 may replace the placeholder list entry 110(C) with new entry 140 that provides an identifying detail about the print job. For example, the file name, size, and/or submitting user may be displayed in interface 105 and new entry 140 may then be selectable for an operation, such as printing.

In some implementations, instructions 220 may comprise instructions to display a plurality of identifying details about a respective plurality of available print jobs upon receiving a valid authentication associated with the respective plurality of available print jobs. For example, a user may have submitted three different secure print jobs that each require entry of the same PIN. Upon receiving that PIN, user interface 105 may display identifying entries for all three of those print jobs. Should the same user have submitted a fourth secure print job with a different PIN, that fourth job may remain obfuscated under the placeholder entry 110(C) until the different PIN is received.

In some implementations, the placeholder list entry may be selected via the user interface for a delete operation by a user with administrative privileges before a valid authentication is received. In some implementations, the identifying detail about the at least one available print job may remain hidden from the user with administrative privileges. For example, a user may select the placeholder entry 110(C), then select the delete key 120 to delete the secure job(s) without providing the authentication. In some implementations, a user may need to provide an administrative authentication, which may be different from the secure job's required authentication, in order to perform the delete function. For example, a user may provide the username and password of an administrator via interface 105 and may be empowered to delete any job, secure or not. The administrative user may still have identifying details of secure jobs obfuscated by the placeholder entry 110(C), however.

Figure 3:
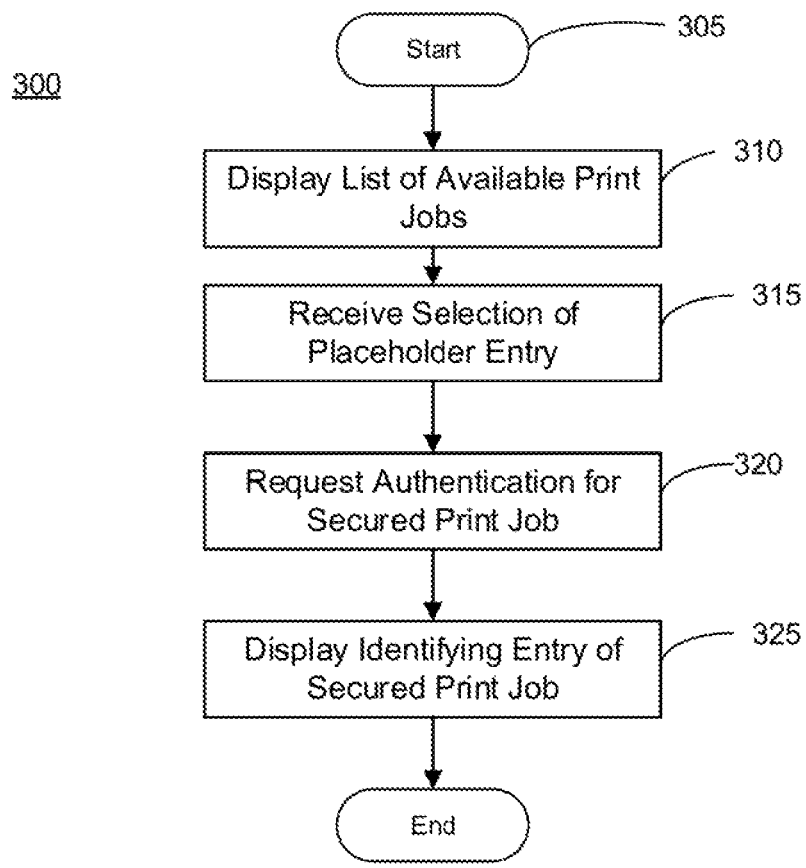
FIG. 3 is a block diagram of an example system for providing print job listing.

FIG. 3 is a flowchart of an example method 300 for print job listing. Although execution of method 300 is described below with reference to computing device 310, other suitable components for execution of method 300 may be used.

Method 300 may begin at stage 305 and advance to stage 310 where device 210 may display, in a user interface, a list of available print jobs, wherein at least one of the available print jobs comprising a secured print job is displayed as a placeholder entry instead of an identifying entry. For example, device 210 may display user interface 105 listing print jobs 110(A)-110(C) submitted by one and/or more users. For jobs that are secured, such as by a PIN, password, and/or other required authentication, user interface 105 may display a placeholder list entry such as print job 110(C) that says "Secure Job" instead of providing any details such as the file name, size, submitting user, etc. The actual text of the placeholder list entry may be different, and/or may be configurable. In some implementations, for example, the entry may specify the user but not the details about the print job, such as "JSmith's Secure Job". In other implementations, print jobs may be displayed in folders, such as may be sorted by user such that each user's print jobs are in their own folder. In these implementations, secure print jobs may be displayed under a user's folder and/or in a separate "Secure Jobs" folder that serves to indicate that the secure jobs are available for unlocking and processing. In some implementations, the placeholder entry may indicate how many secure jobs are waiting, such as with a number in parentheses (e.g., "Secure Jobs (5)").

Method 300 may then advance to stage 315 where device 210 may receive a selection of the placeholder entry. For example, the list of print jobs 110(A)-110(C) may comprise selectable user elements. For example, a user may touch and/or use an interface device (e.g., mouse) to select each desired job and then select an operation, such as print function key 115 to perform that function.

In some implementations, selection of a non-placeholder entry from the list of available print jobs may enable selection of an operation to be performed on a respective print job for the non-placeholder entry. In some implementations, selection of the placeholder entry without verification of the authentication may only enable a deletion operation of the secured print job. In some implementations, the placeholder entry may comprise a count of a number of secured print jobs in the list of available print jobs. For example, different users may submit secured print jobs that may each be associated with different authentication requirements (e.g., different PINs). In such implementations, the placeholder entry may include a count of the number of secured jobs waiting (e.g., using a placeholder entry of "Secure Print Job(s): 10" in lieu of details about any of the secured print jobs). Upon receiving the authentication for one and/or more of the secure print jobs, those authenticated jobs' details may be displayed in individual list entries. In some implementations, the count of secure jobs waiting may be adjusted to reflect those jobs waiting for which authentication has not yet been received.

Method 300 may then advance to stage 320 where device 210 may request an authentication for the secured print job. For secure jobs, the placeholder entry may not immediately be selectable; attempts to select the placeholder entry may instead cause device 210 to display an authentication request such as authentication element 130 in user interface 105. Similar elements may be used to provide alternate instructions (e.g. "scan your ID badge", "Approve access to secure job through mobile app", "Enter username and password", etc.) Any number of authentication methods may be accepted and then verified for validity before replacing the placeholder entry and/or allowing a function, such as print, to be performed on one and/or more secured job.

Method 300 may then advance to stage 325 where device 210 may display the identifying entry of the secured print job upon verification of the authentication. In some implementations, device 210 may display the identifying entry of a second (or more) secured print job upon verification of the authentication. Such an authentication may comprise, for example, a personal identification number (PIN) associated with both the secured print job and the second secured print job. For example, device 210 may display the identifying detail about the at least one available print job upon receiving a valid authentication via the authentication element. For example, after receiving a verified PIN in authentication element 130, user interface 105 may replace the placeholder list entry 110(C) with new entry 140 that provides an identifying detail about the print job. For example, the file name, size, and/or submitting user may be displayed in interface 105 and new entry 140 may then be selectable for an operation, such as printing.

In some implementations, device 210 may display a plurality of identifying details about a respective plurality of available print jobs upon receiving a valid authentication associated with the respective plurality of available print jobs. For example, a user may have submitted three different secure print jobs that each require entry of the same PIN. Upon receiving that PIN, user interface 105 may display identifying entries for all three of those print jobs. Should the same user have submitted a fourth secure print job with a different PIN, that fourth job may remain obfuscated under the placeholder entry 110(C) until the different PIN is received.

Method 300 may then end at stage 350.

Figure 4:
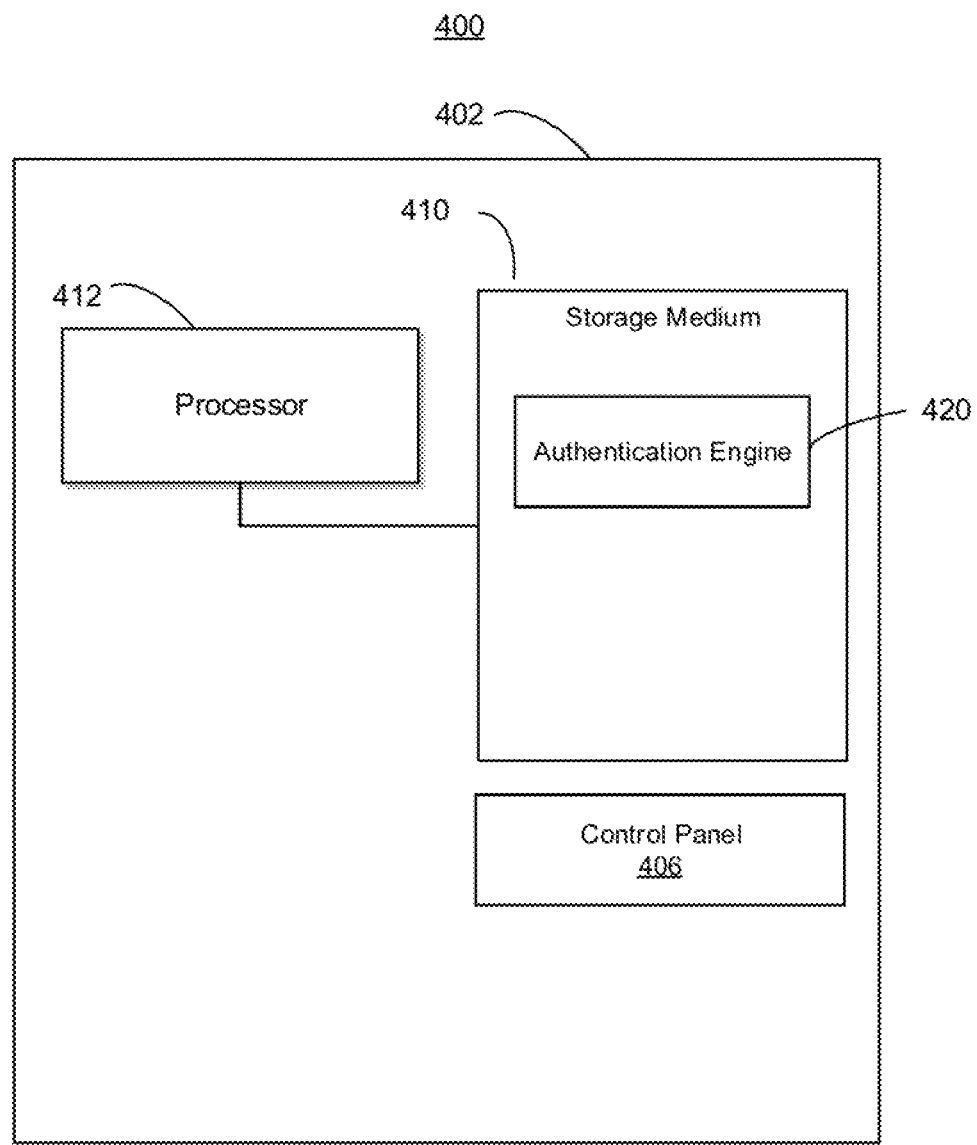
FIG. 4 is a flowchart of an example method for providing print job listing.

FIG. 4 is a block diagram of an example apparatus 400 for providing print job listing. Apparatus 400 may comprise a multi-function printer device 402 comprising a control panel 406, a storage medium 410, and a processor 412. Device 402 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 402 may store, in storage medium 410, an authentication engine 420.

Engine 420 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engine 420. In such examples, device 402 may comprise the machine-readable storage medium storing the instructions and the processing resource to execute the instructions, or the machine-readable storage medium may be separate but accessible to apparatus 400 and the processing resource.

Control panel 406 may display a list of available print jobs. In some implementations, at least one of the available print jobs comprising a secured print job may be displayed as a placeholder entry instead of an identifying entry. Control panel 406 may further receive a selection of the placeholder entry and display a request for an authentication for the secured print job.

For example, apparatus 400 may display user interface 105 listing print jobs 110(A)-110(C) submitted by one and/or more users. For jobs that are secured, such as by a PIN, password, and/or other required authentication, user interface 105 may display a placeholder list entry such as print job 110(C) that says "Secure Job" instead of providing any details such as the file name, size, submitting user, etc. The actual text of the placeholder list entry may be different, and/or may be configurable. In some implementations, for example, the entry may specify the user but not the details about the print job, such as "JSmith's Secure Job". In other implementations, print jobs may be displayed in folders, such as may be sorted by user such that each user's print jobs are in their own folder. In these implementations, secure print jobs may be displayed under a user's folder and/or in a separate "Secure Jobs" folder that serves to indicate that the secure jobs are available for unlocking and processing. In some implementations, the placeholder entry may indicate how many secure jobs are waiting, such as with a number in parentheses (e.g., "Secure Jobs (5)").

The list of print jobs 110(A)-110(C) may comprise selectable user elements. For example, a user may touch and/or use an interface device (e.g., mouse) to select each desired job and then select an operation, such as print function key 115 to perform that function. For secure jobs, the placeholder entry may not be selectable; attempts to select the placeholder entry may instead cause apparatus 400 to display an authentication request such as authentication element 130 in user interface 105. Similar elements may be used to provide alternate instructions (e.g. "scan your ID badge", "Approve access to secure job through mobile app", "Enter username and password", etc.) Any number of authentication methods may be accepted and then verified for validity before replacing the placeholder entry and/or allowing a function, such as print, to be performed on one and/or more secured job.

Authentication engine 420 may determine whether a received authentication is verified for the selected placeholder entry. For example, engine 420 may compare a received PIN code to a verified PIN code received at the time the print job was received and/or stored. If the PIN codes match, the authentication may be verified. Other authentication methods are contemplated, such as user login, biometric scanners, card/RFID readers, etc.

In response to determining that the received authentication is verified for the selected placeholder entry, authentication engine 420 may authorize the control panel to display the identifying entry in place of the placeholder entry. For example, apparatus 400 may display the identifying detail about the at least one available print job upon receiving a valid authentication via the authentication element. For example, after receiving a verified PIN in authentication element 130, user interface 105 may replace the placeholder list entry 110(C) with new entry 140 that provides an identifying detail about the print job. For example, the file name, size, and/or submitting user may be displayed in interface 105 and new entry 140 may then be selectable for an operation, such as printing.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine-readable storage medium having stored thereon machine-readable instructions executable to cause a processor to:
   provide a user interface element for listing available print jobs;
   determine whether at least one available print job comprises a secured print job;
   in response to determining that the at least one available print job comprises the secured print job, display a placeholder list entry instead of an identifying detail about the at least one available print job, wherein the placeholder list entry specifies a submitting user; and
   display the identifying detail about the at least one available print job upon verification of a requested authentication for the secured print job, wherein the machine-readable instructions further cause the processor to compare a received authentication item to a verified authentication item received at a time the at least one available print job was received or stored.

2. The medium of claim 1, wherein the identifying detail about the at least one print job comprises at least one of the following: a name of the print job, a user associated with the print job, and a size of the print job.

3. The medium of claim 1, wherein the instructions to provide the user interface element further comprise instructions to provide the placeholder list entry as a selectable user interface element.

4. The medium of claim 3, wherein the instructions to provide the user interface element further comprise instructions to provide an authentication element in response to receiving a selection of the selectable user interface element.

5. The medium of claim 4, wherein the instructions to provide the user interface element further comprise instructions to display the identifying detail about the at least one available print job upon receiving a valid authentication via the authentication element.

6. The medium of claim 1, wherein the instructions to provide the user interface element further comprise instructions to display a plurality of identifying details about a respective plurality of available print jobs upon receiving a valid authentication associated with the respective plurality of available print jobs.

7. The medium of claim 1, wherein the placeholder list entry cannot be selected via the user interface element for an operation until a valid authentication is received.

8. The medium of claim 1, wherein the placeholder list entry can be selected via the user interface element for a delete operation by a user with administrative privileges before a valid authentication is received.

9. The medium of claim 8, wherein the identifying detail about the at least one available print job remains hidden from the user with administrative privileges.

10. A method comprising:
    displaying, in a user interface, a list of available print jobs, wherein at least one of the available print jobs comprising a first secured print job is displayed as a placeholder entry instead of an identifying entry, and wherein the placeholder entry specifies a submitting user;
    receiving a selection of the placeholder entry;
    requesting an authentication for the first secured print job; and
    displaying the identifying entry of the first secured print job upon verification of the authentication, including comparing a received authentication item to a verified authentication item received at a time the first secured print job was received or stored.

11. The method of claim 10, wherein selection of a non-placeholder entry from the list of available print jobs enables selection of an operation to be performed on a respective print job for the non-placeholder entry.

12. The method of claim 10, wherein the placeholder comprises a count of a number of secured print jobs in the list of available print jobs.

13. The method of claim 10, further comprising displaying an identifying entry of a second secured print job upon verification of the authentication.

14. The method of claim 13, wherein the authentication comprises a personal identification number associated with the first secured print job and the second secured print job.

15. An apparatus, comprising:
 a control panel to:
  display a list of available print jobs, wherein at least one of the available print jobs comprising a secured print job is displayed as a placeholder entry instead of an identifying entry, wherein the placeholder entry specifies a submitting user,
  receive a selection of the placeholder entry, and
  display a request for an authentication for the secured print job;
 an authentication engine to:
  determine whether a received authentication is verified for the selected placeholder entry; and
  in response to determining that the received authentication is verified for the selected placeholder entry, authorize the control panel to display the identifying entry in place of the placeholder entry, including comparing a received authentication item to a verified authentication item received at the time the secured print job was received or stored.

16. The apparatus of claim 15, wherein the identifying entry comprises at least one of the following: a name of the print job, a user associated with the print job, and a size of the print job.

17. The apparatus of claim 16, wherein the control panel is further to display a plurality of identifying entries about a respective plurality of available print jobs upon receiving a valid authentication associated with the respective plurality of available print jobs.

18. The apparatus of claim 16, wherein the placeholder entry cannot be selected via a user interface element for an operation until a valid authentication is received.

19. The apparatus of claim 16, wherein the placeholder entry can be selected via a user interface element for a delete operation by a user with administrative privileges before a valid authentication is received.

20. The apparatus of claim 16, wherein the placeholder entry comprises a count of a number of secured print jobs in the list of available print jobs.

* * * * *